United States Patent
Gutarin (10) Patent No.: US 8,081,848 B2
(45) Date of Patent: Dec. 20, 2011

(54) EXTRACTING METADATA FROM A DIGITALLY SCANNED DOCUMENT

(75) Inventor: Alex Gutarin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/854,987

(22) Filed: Sep. 13, 2007

(65) Prior Publication Data

US 2009/0073501 A1 Mar. 19, 2009

(51) Int. Cl.
*H04N 1/00* (2006.01)

(52) U.S. Cl. ............. 382/306; 358/403; 358/486

(58) Field of Classification Search ............ 382/176, 382/180, 181, 224, 226, 227, 228, 229, 325; 358/403, 486
See application file for complete search history.

(56) References Cited

U.S. PATENT DOCUMENTS

| | | | |
|---|---|---|---|
| 4,817,169 A * | 3/1989 | Peppers et al. ........... 382/173 |
| 6,044,375 A | 3/2000 | Shmueli | |
| 7,162,691 B1 | 1/2007 | Chatterjee | |
| 7,475,335 B2 * | 1/2009 | Krishna et al. ............ 715/229 |
| 7,529,408 B2 * | 5/2009 | Vohariwatt et al. ........ 382/180 |
| 7,639,898 B1 * | 12/2009 | Chan ....................... 382/305 |
| 2003/0042319 A1 * | 3/2003 | Moore ...................... 235/494 |
| 2003/0115219 A1 | 6/2003 | Chadwick | |
| 2004/0015775 A1 | 1/2004 | Simske | |
| 2005/0041680 A1 | 2/2005 | Tanaka et al. | |
| 2005/0185225 A1 | 8/2005 | Brawn | |
| 2006/0095830 A1 | 5/2006 | Krishna | |
| 2006/0126114 A1 | 6/2006 | Choi | |
| 2007/0112844 A1 | 5/2007 | Tribble | |

OTHER PUBLICATIONS

Indexing / Metadata Extraction, http://www.acg-usa.com/data_indexing.html, 2005.
Metadata Extraction from Bibliographic Documents for Digital Library, http://www.loria.fr/projets/wwwstic/publi_ps/belaid-besagni.pdf, 2007.

* cited by examiner

*Primary Examiner* — Stephen Koziol
(74) *Attorney, Agent, or Firm* — Shook Hardy & Bacon LLP (57) ABSTRACT

Presented are techniques for extracting metadata from a digitally scanned document. The text of the digitally scanned document is obtained and a first algorithm is provided to identify various numbers found within the text, determine which numbers correspond to the page numbers of the document, and associate the determined numbers with the pages of the document. Furthermore, a second algorithm is provided that uses the text to determine the page type of the pages within the document. The second algorithm is configured to determine if a page is a table of contents page, an index page, or a title page.

10 Claims, 6 Drawing Sheets

EXTRACTING METADATA FROM A DIGITALLY SCANNED DOCUMENT

BACKGROUND

Today, there are many websites with search engines dedicated to searching for specific types of content. One specific type of content that some websites provide searching services for is books. Such search engines typically require the digitization and indexing of books supplied by libraries, publishers, and other book providers. Typically, metadata of a book such as the author, title, publisher, copyright year, subjects, correlation between leaf numbers of pages and page numbers printed in the book, the book structure (leaf number of title page, leaf number of table of contents pages, leaf number of index pages), table of contents data (list of chapter names with corresponding page leaf numbers), and index data (list of index terms with corresponding page leaf numbers) is needed to be identified, associated, and indexed with the actual contents of the book.

Books that are not available in digital form are usually scanned using optical character recognition (OCR) technology. However, many problems exist with OCR technology: OCR software typically does not perform any metadata extraction; the quality of OCR output is not perfect as some words do not get recognized correctly; the OCR software is usually not able to detect different formatting between different publishers and copyright years; and the OCR software may not be able to detect more than one sequence of page numbers in a book.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Presented are techniques for extracting metadata from a digitally scanned document. Provided is a page identification component that is configured to receive text from a digitally scanned document, identify numbers from the text, determine which of the numbers are corresponding page numbers of pages of the document, and associate the determined numbers with the pages of the document in a database. Additionally, a structure analysis component is provided for receiving the text of the digitally scanned document and determining a page type of the pages of the document. The page type may be at least one of a table of contents page, an index page, and a title page.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
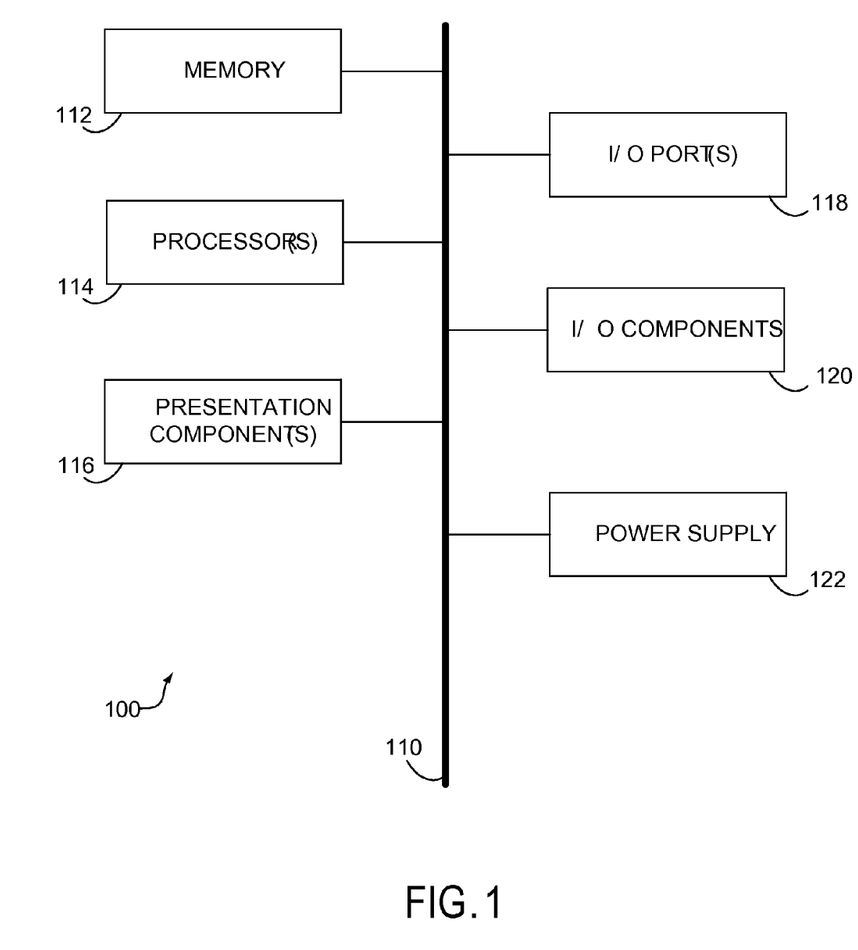
FIG. 1 is a block diagram of exemplary components of a computing device according to an embodiment of the invention.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
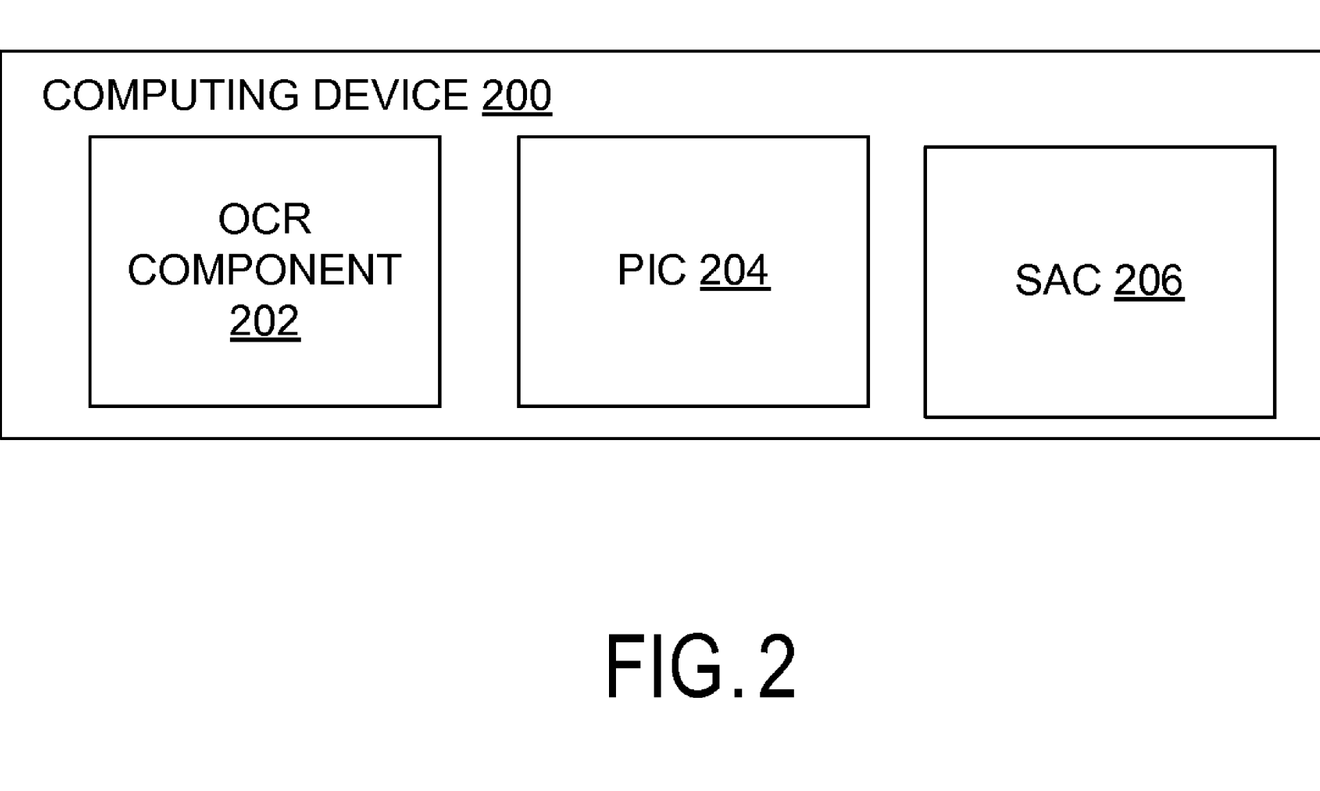
FIG. 2 is a block diagram of an exemplary computing device according to an embodiment of the invention.

FIG. 2 is a block diagram of an embodiment of an exemplary computing device 200 according to an embodiment of the invention. Computing device 200 includes components such as optical character recognition (OCR) component 202, page identification component (PIC) 204, and structure analysis component (SAC) 206. Computing device 200 further includes a communication interface (not shown). The communication interface may be an interface that can allow the computing device 200 to be directly connected to any other device or allows the computing device to be connected to another device over a network (not shown). The network can include, for example, a local area network (LAN), a wide area network (WAN), or the Internet. In an embodiment, the computing device 200 can be connected to another device via a wireless communication interface through the network.

Computing device 200 may be or can include a desktop computer, a laptop computer or other mobile computing device, a network-enabled cellular telephone (with or without media capturing/playback capabilities), wireless email client, or other client, machine or device to perform various tasks including Web browsing, search, electronic mail (email) and other tasks, applications and functions. Computing device 200 may additionally be any portable media device such as digital still camera devices, digital video cameras (with or without still image capture functionality), media players such as personal music players and personal video players, and any other portable media device. Computing device 200 may also be or can include a server such as a workstation running the Microsoft Windows, MacOS™, Unix™, Linux™, Xenix™, IBM AIX™, Hewlett-Packard UX™, Novell Netware™, Sun Microsystems Solaris™, OS/2™, BeOS™, Mach™, Apache™, OpenStep™ or other operating system or platform.

OCR component 202 is a computer hardware or software component configured to produce a text document for each page of a digitally scanned document. The digitally scanned document may be any type of document that has page numbers. For example, the digitally scanned document may be a book, article, journal, magazine, etc. Once the document has been scanned, the OCR component 202 can be executed on the digitally scanned document to extract the text found on each page of the document. An OCR document is produced by the OCR component 202 and includes the extracted text from each page of the digitally scanned document. In an embodiment, the OCR document will have the same pages and corresponding text as the digitally scanned document.

However, due to the limitations of using OCR technology discussed previously, the OCR component 202 may not be able to identify certain metadata that is needed to be indexed into a search engine for searching purposes. Such information may include: the proper page number that corresponds to each page; an identification of the page within the digitally scanned document is the title page; an identification of pages within the digitally scanned document that are table of contents pages; and an identification of pages within the digitally scanned document that are index pages. The PIC 204 and the SAC 206 are two new components that have been created to extract the aforementioned metadata.

Figure 3:
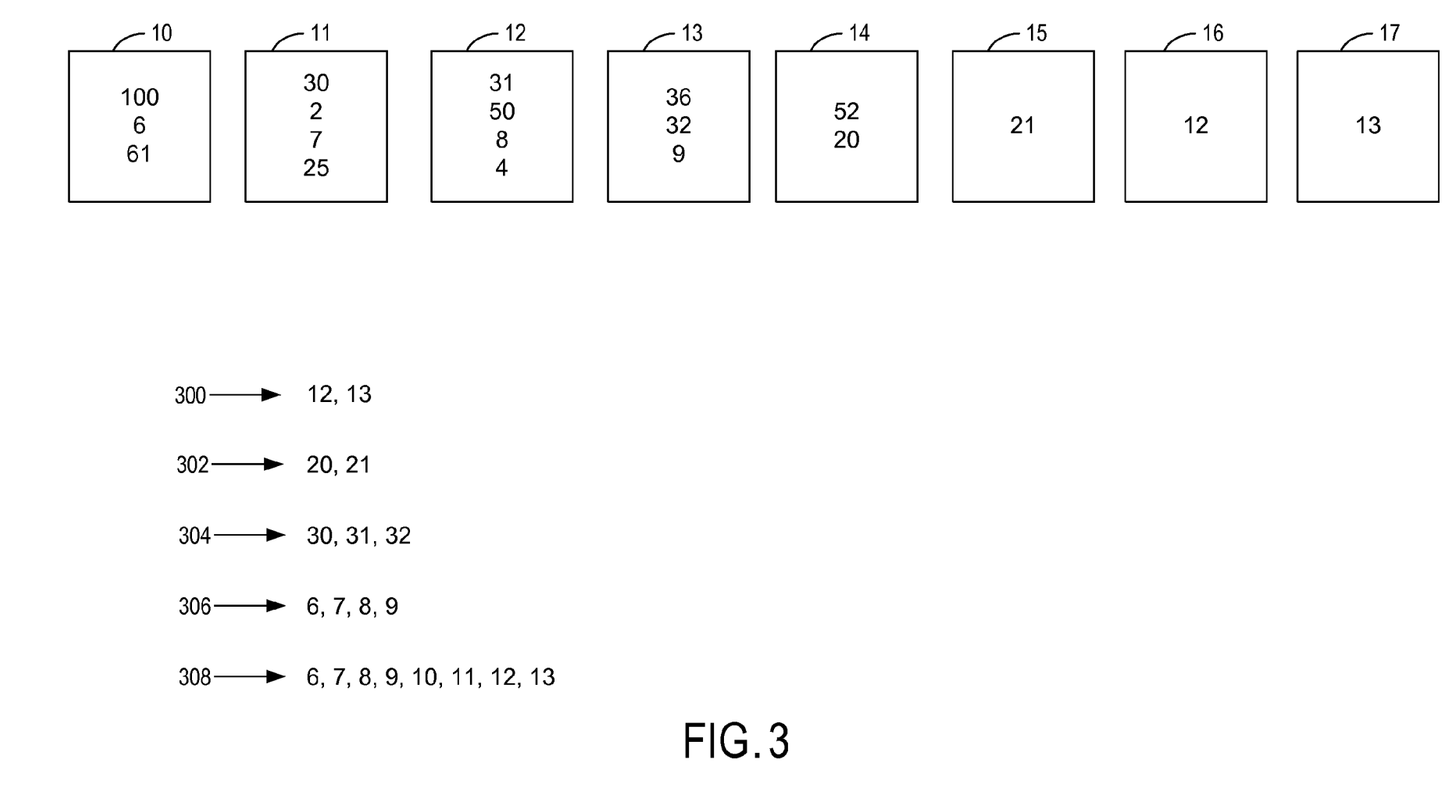
FIG. 3 is an example of the lists of numbers identified on pages of an OCR document according to an embodiment of the invention.
Figure 4:
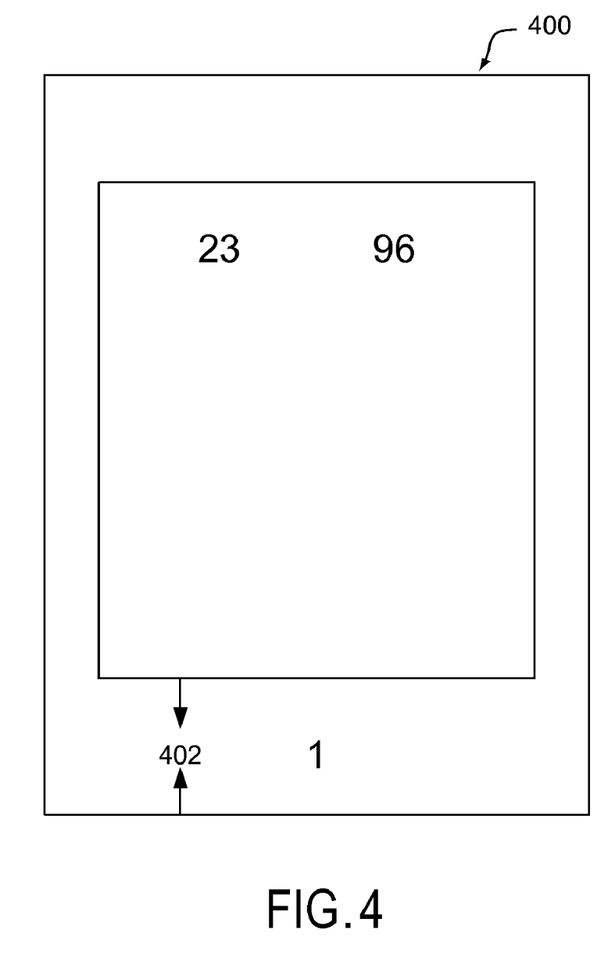
FIG. 4 is an example of numbers being identified in an outer region of a page according to an embodiment of the invention.

PIC 204 is a computer hardware or software component with logic to identify and associate page numbers with each page of a digitally scanned document once the document has been processed by the OCR component 202. The logic includes an algorithm for determining the proper page numbers for each of the pages of the digitally scanned document. Once OCR component 202 produces the OCR document, the OCR document is received by the PIC 204 for processing. The PIC 204 first creates a list of each number found on each page of the OCR document. FIG. 3 is an example of the lists of numbers identified on pages of the OCR document according to an embodiment of the invention. FIG. 3 shows the page numbers identified for each of pages 10-17 of the OCR document. In an embodiment, the PIC 204 will only consider numbers found in an outer region surrounding a page of the digitally scanned document as it may be believed that actual page numbers will generally be found in this outer region. For example, as shown in FIG. 4, only numbers within the outer region 402 of page 400 will be identified by the PIC 204. For example, only number "1" will be identified by the PIC 204 since it is located within the outer region of the page. Numbers "23" and "96" will not be identified by the PIC 204 since they are not located within the outer region. The size of the outer region may be predetermined by the developer of PIC 204, administrator of PIC 204, or any other entity authorized to set the size of the outer region. Once the lists of identified numbers for each page has been created, in an embodiment, the PIC 204 can further filter the list of numbers, for instance, by discarding negative numbers found on any pages or numbers that are greater than the total number of pages within the digitally scanned or OCR document.

The PIC 204 can proceed to generate sequences from the numbers found on each page of the OCR document. In an embodiment, the sequences are generated by locating a first number on a first page and determining if a number incremented by one is found on a separate adjacent page to the first page. For example, referring to FIG. 3, a sequence 300 of "12, 13" can be generated from pages 16 and 17, a sequence 302 of "20, 21" can be generated from pages 14 and 15, a sequence 304 of "30, 31, 32" can be generated from pages 11-13, and a sequence 306 of "6, 7, 8, 9" can be generated from pages 10-13.

The PIC 204 can then assign a confidence level identifier to each of the generated sequences that correspond to a level of confidence that the sequence of numbers actually correspond to the page numbers of the pages of the digitally scanned document. In an embodiment, the confidence level identifier is assigned based on the length of the sequence. In an embodiment, the confidence level identifier is the length of the sequence. For example, sequences 300 and 302 each would be assigned a confidence level identifier of 2, sequence 304 would be assigned a confidence level identifier of 3, and sequence 306 would be assigned a confidence level identifier of 4. In an embodiment, the confidence level identifiers are also associated with each number within the sequence.

In an embodiment, the PIC 204 can also be configured to connect two or more sequences if such sequences can be used to create one longer sequence. In an embodiment, the PIC 204 will connect a first sequence together with a second sequence when a number of pages between a last page number of the first sequence and a first page number in the second sequence is one less than the last page number subtracted from the first page number. For example, the last page number of sequence 306 is "9," the first page number of sequence 300 is 12, and there are two pages between the two sequences. Sequences 306 and 300 can be connected together since the number of pages between them (2) is one less than the result of the last page number of the first sequence (9) subtracted from the first page number of the second sequence (12) which is 3. Once the two sequences are connected, the pages between the sequences are assigned numbers that complete the connected sequence. For example, pages 14 and 15 would be assigned page numbers "10" and "11" to complete the connected sequence 308 of "6, 7, 8, 9, 10, 11, 12, 13" with a confidence level identifier of 8.

In an embodiment, two sequences are not connected together if the confidence level identifier of any numbers between the two sequences is higher than the confidence level identifiers of the either of the two sequences. For example, number "50" of page 12 would not be connected to number "52" of page 14 since number "9" of page 13 has a confidence level identifier of 4 even before the connected sequence 308 is created. In another embodiment, the two sequences are not connected if the confidence level of the potentially connected sequence is not greater than any numbers between the two sequences. For example, connecting "50" with "52" would potentially create a sequence of "50, 51, 52" with a confidence level of 3. However, the sequence of "50, 51, 52" would not be created as the confidence level of 3 would still not be greater than number 9's confidence level of 4.

In an embodiment, the PIC 204 can filter the lists of sequences by discarding sequences that do not have confidence level identifiers that reach a predetermined threshold value. For example, the predetermined threshold value may be set to "3." Accordingly, 304, 306, and 308 would be identified as having reached the threshold value and sequences 300 and 302 would be discarded from being considered as potential page numbers since they have confidence level identifiers of "2."

Once the PIC has discarded the inadequate sequences, the PIC 204 can determine which of the remaining sequences has the highest confidence level identifier and can associate such sequences with the corresponding pages of the OCR document. For example, since sequence 308 has the highest confidence level identifier of 8, sequence 308 is assigned to and associated with the tenth through seventeenth pages of the OCR document. The association of the assigned page numbers and the pages of the OCR document are then stored in a database for future use.

The SAC 206 is a computer hardware or software component with logic to analyze the text of each page of an OCR document to determine the page type for at least a portion of the pages (e.g., whether a page is a title page, a table of contents page, or an index page). The logic includes an algorithm for determining the type of page for each of the pages of a digitally scanned document. Once PIC component 204 identifies the page numbers of the OCR document, the OCR document is further processed by the SAC 206 to identify each page's page type.

The SAC 206 first analyzes the text of each page within the OCR document to determine a first score that corresponds to the likelihood the page is a table of contents page, a second score that corresponds to the likelihood the page is an index page, and a third score that corresponds to the likelihood the page is a title page. The first score is determined by identifying the amount of table of contents page characteristics found on the page. The table of contents page characteristics are parameters that are generally found on a typical table of contents page. For example, some table of contents page characteristics can be, but are not limited to: the page area covered by words, the number of columns found on the page; the percentage of lines starting with the word "chapter;" the number of sequences of lines ending with a number; a ratio of the length of the longest sequence of lines ending with an increasing number divided by the number of lines ending with a number; the presence of keywords such as "Table of Contents" and "contents" found on the page; and the presence of keywords not indicating a table of contents page such as "index," "glossary," and "illustrations." The greater the likelihood the page is a table of contents page, the higher its corresponding table of contents page score will be.

The second score is determined by identifying the amount of index page characteristics found on the page. The index page characteristics are parameters that are generally found on a typical index page. For example, some index page characteristics can be, but are not limited to: the page area covered by words, the number of index entries found on the page; a ratio of the length of the longest sequence of alphabetized indexed entries divided by the number indexed entries; the presence of keywords indicating an index page; and the presence of keywords not indicating an index page. The greater the likelihood the page is an index page, the higher its corresponding index page score will be.

The third score is determined by identifying the amount of title page characteristics found on the page. The title page characteristics are parameters that are generally found on a typical title page. For example, some index page characteristics can be, but are not limited to: the presence of the keywords "title" and "author" found on the page; the font size of the words on the page; the location of the page (i.e. odd pages located close to the beginning of the document may receive a higher score). The greater the likelihood the page is a title page, the higher its corresponding title page score will be.

Once the three scores for each page have been calculated, a mean score for each type of score (table of contents page, index page, and title page) is calculated based the scores of all of the pages in OCR document. For example, a first mean score will be calculated based on each page's table of contents page score, a second mean score will be calculated based on each page's index page score, and a third score will be calculated based on each page's title page score. Once the three mean scores have been calculated, candidate table of contents pages, candidate index pages, and candidate title pages are identified. Such identified pages are pages that have a score for a particular type of page that is greater than predetermined value of standard deviations away from the corresponding mean score. The predetermined value of standard deviations may be set by an administrator or other authorized entity. In an embodiment, the candidate title page with the highest number of standard deviations away from the title page mean score is considered the title page of the OCR document and is assigned the title page identifier. In another embodiment, the candidate title page with the highest third score (title page score) is considered the title page and is assigned the title page identifier.

Once the candidate table of contents and index pages have been identified, a first set of one or more sequences of pages incremented by one are created from the page numbers of the candidate table of contents pages, and a second set of one or more sequences of pages incremented by one are created from the page numbers of the candidate index pages. For example, if a group of candidate pages consisted of pages 8, 144, 7, 36, 9, 11, and 35, a first sequence would be "7, 8, 9" and a second sequence would be "35, 36." Moreover, two or more sequences can be connected together to form a connected sequence when a number of pages that are not candidate pages between a last page number of a first sequence and a first page number of a second sequence is below a first predetermined threshold identifier. For example, in the above example, page 11 may be connected to the sequence "7, 8, 9" if the number of pages between page 9 and 11 (i.e. one page: page 10) was below the predetermined threshold identifier. If the predetermined threshold identifier was 3 pages, page 11 can be added to the sequence since there is only one page between page 9 and 11. In such an example, the pages between the two sequences, page 10 in this example, are added to the connected sequence of candidate pages for the particular type of page (table of contents or index). For example, the connected sequence "7, 8, 9, 10, 11" can be created.

In an embodiment, additional pages next to a sequence or a connected sequence can be added to the sequence or connected sequence by relaxing the requirements for the number of standard deviations away from the mean that a page's table of contents or index page score needs to be in order to be a candidate page. In such an embodiment, a new predetermined value of standard deviations away from the table of contents or index page mean score can be used to determine if the pages close to the sequences should be added. In such an embodiment, the new predetermined value of standard deviations will be less than the original predetermined value that was used to generate the original group of candidate pages. For example, by requiring only 1 standard deviation (new) away from a particular type of mean score for a page to be considered a candidate page instead of 3 standard deviations (original), page 12 (has score that is 1 standard deviation away from the mean) may be recognized as a candidate page and can be added to the above connected sequence to form a new connected sequence of "7, 8, 9, 10, 11, 12."

Once the sequences and connected sequences have been generated, a sequence score is assigned to each sequence and connected sequence. The sequence score is assigned based on the length of the sequence. In an embodiment, the longer the sequence, the higher its sequence score will be. In an embodiment, the length of the sequence is the sequence score. For example, the connected sequence "7, 8, 9, 10, 11, 12" would have a sequence score of 6. Once all scores have been calculated for the sequences of table of contents pages, the sequence of pages with the highest score will be considered the table of contents pages and the table of contents page identifier will be assigned to and associated with the pages of the sequence in a database. Once all scores have been calculated for the sequence of index pages, the sequence of pages with the highest score will be considered the index pages and the index page identifier will be assigned to and associated with the pages of the sequence in a database.

In an embodiment, some sequences may be split apart and their corresponding sequence score may be lowered accordingly if a multi-page property test fails across all pages within the sequence. For example, for a sequence of candidate table of contents pages, a multi-page property test of calculating a ratio of the length of the longest sequence of lines ending with an increasing number divided by the number of lines ending with a number can be applied to all pages in the sequence. If the ratio drops below a certain predetermined threshold value at any identified page, the identified page may be removed from the sequence as well as any pages that come after the identified page. For a sequence of candidate index pages, a multi-page property test of calculating a ratio of the length of the longest sequence of alphabetized indexed entries divided by the number indexed entries can be applied to all pages in the sequence. If the ratio drops below a certain predetermined threshold value at any identified page, the identified page may be removed from the sequence as well as any pages that come after the identified page.

Figure 5:
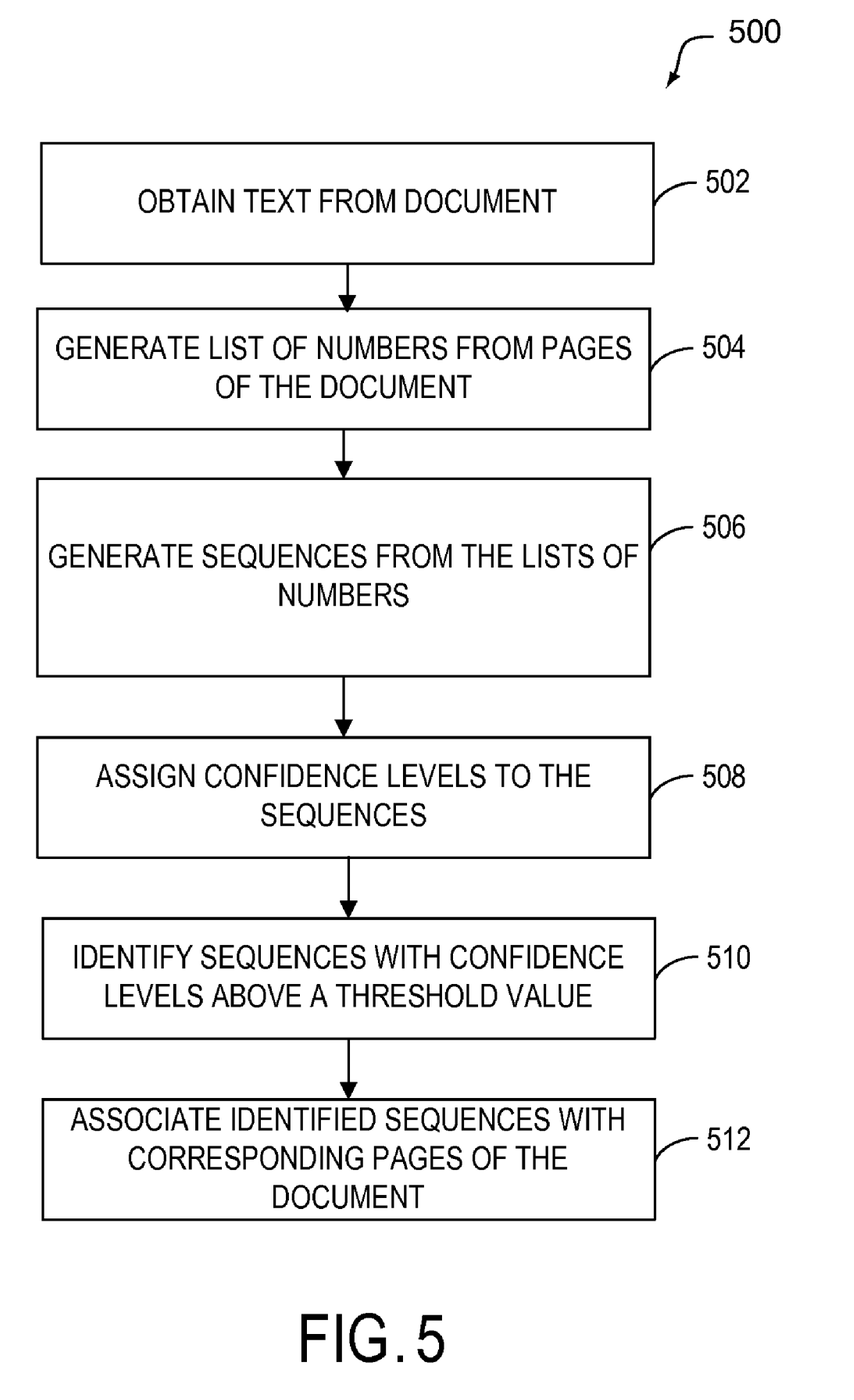
FIG. 5 is a flow diagram of an exemplary method for extracting metadata from a digitally scanned document according to an embodiment of the invention.

FIG. 5 is a flow diagram of an exemplary method 500 for extracting metadata from a digitally scanned document according to an embodiment of the invention. At operation 502, text from a digitally scanned document is obtained. In an embodiment, the text may be obtained using OCR technology. At operation 504 a list of one or more numbers found on each page is generated for at least a portion of a plurality of pages within the document. At operation 506, sequences of numbers incremented by one from the list of one or more numbers are created from each of the at least a portion of the plurality of pages. In an embodiment, each number in the sequence is from a separate adjacent page. At operation 508, a first confidence level is assigned to each of the one or more sequences. In an embodiment, the first confidence level corresponds to the length of the corresponding sequence. At operation 510, sequences that have a confidence level above a first predetermined threshold value are identified. At operation 512, the identified sequences are associated to corresponding pages of the digitally scanned document within a database. In an embodiment, operations 502, 504, 506, 508, 510, and 512 are performed by a PIC 204.

Figure 6:
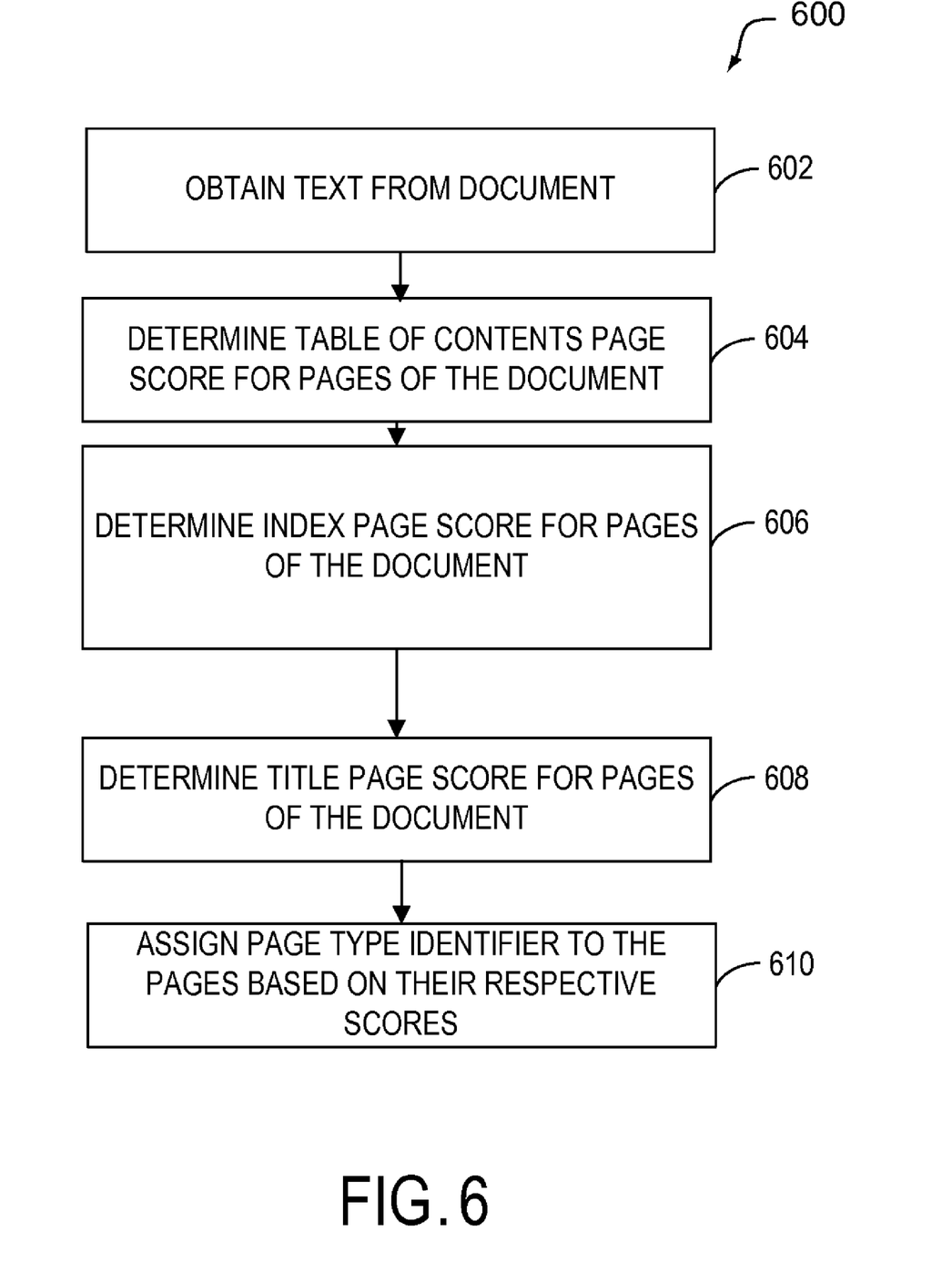
FIG. 6 is a flow diagram of another exemplary method for extracting metadata from a digitally scanned document according to an embodiment of the invention.

FIG. 6 is a flow diagram of another exemplary method 600 for extracting metadata from a digitally scanned document according to an embodiment of the invention. At operation 602, text from a digitally scanned document is obtained. In an embodiment, the text is obtained using OCR technology. At operation 604, a first score is determined for each page within the document, wherein the first score corresponds to the likelihood the page is a table of contents page. At operation 606, a second score is determined for each page within the document, wherein the second score corresponds to the likelihood the page is an index page. At operation 608, a third score is determined for each page within the document, wherein the third score corresponds to the likelihood the page is a title page. At operation 610, a title page identifier, a table of contents page identifier, and an index page identifier is assigned to one or more pages within the document based on the first, second, and third scores. In an embodiment, operations 602, 604, 606, 608, and 610 are performed by a SAC 206.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

I claim:

1. One or more non-transitory computer-readable media having computer-usable instructions stored thereon for performing a method for extracting metadata from a digitally scanned document, the method comprising:
   obtaining text from a digitally scanned document;
   determining a first score for each page within the document that corresponds to the likelihood the page is a table of contents page;
   determining a second score for each page within the document that corresponds to the likelihood the page is an index page;
   calculating a mean score for each of the first and second scores of all pages within the document;
   determining one or more candidate table of contents pages that have a first score that is greater than a first predetermined value of standard deviations from the mean score of the first scores;
   determining one or more candidate index pages that have a second score that is greater than a second predetermined value of standard deviations from the mean score of the second scores;
   determining a third score for each page within the document that corresponds to the likelihood the page is a title page; and
   assigning a title page identifier, a table of contents page identifier, and an index page identifier to one or more pages within the document based on the first, second, and third scores, wherein the table of contents identifier is assigned to at least one of the one or more candidate table of contents pages, and wherein the index page identifier is assigned to at least one of the one or more candidate index pages.

2. The media according to claim 1, wherein the first score is determined based on table of contents page characteristics, the second score is determined based on index page characteristics, and the third score is determined based on title page characteristics.

3. The media according to claim 1, the method further comprising assigning the title page identifier to a page with a highest third score.

4. The media according to claim 1, the method further comprising:
   identifying a first set of page numbers of the one or more candidate table of contents pages;
   building a first set of sequences with the first set of page numbers;
   identifying a second set of page numbers of the one or more candidate index pages; and
   building a second set of sequences with the second set of page numbers.

5. The media according to claim 4, the method further comprising:
   connecting at least two sequences from the first set to form a first connected sequence when a number of pages that are not candidate table of contents pages between a last page number of a first sequence and a first page number of a second sequence is below a first predetermined threshold identifier;
   assigning the pages between the first connected sequence as candidate table of contents pages;
   connecting at least two sequences from the second set to form a second connected sequence when a number of pages that are not candidate index pages between a last page number of a third sequence and a first page number of a fourth sequence is below a second predetermined threshold identifier; and
   assigning the pages between the second connected sequence as candidate index pages.

6. The media according to claim 5, the method further comprising:
   identifying pages at least one of before and after the first connected sequence that are greater than a third predetermined value of standard deviations from the mean score of the first scores, wherein the third predetermined value is less than the first predetermined value;
   assigning the identified pages that are at least one of before and after the first connected sequence as candidate table of contents pages;
   identifying pages at least one of before and after the second connected sequence that are greater than a fourth predetermined value of standard deviations from the mean score of the second scores, wherein the fourth predetermined value is less than the second predetermined value; and
   assigning the identified pages that are at least one of before and after the second connected sequence as candidate index pages.

7. The media according to claim 6, the method further comprising:
   calculating a first sequence score for each sequence in the first set of sequences and for each first connected sequence; and
   calculating a second sequence score for each sequence in the second set of sequences and for each second connected sequence.

8. The media according to claim 7, the method further comprising splitting up sequences that have a sequence score below a third predetermined threshold identifier.

9. The media according to claim 7, the method further comprising:
   identifying a sequence with the highest first sequence score; and
   assigning the pages within the sequence with the highest first score with the table of contents page identifier.

10. The media according to claim 7, the method further comprising:
   identifying a sequence with the highest second sequence score; and
   assigning the pages within the sequence with the highest second score with the index page identifier.

* * * * *